(12) United States Patent
Åkerlund

(10) Patent No.: US 6,792,024 B2
(45) Date of Patent: Sep. 14, 2004

(54) LASER ARRANGEMENT

(75) Inventor: Hans Åkerlund, Götaborg (SE)

(73) Assignee: Saab AB, Linköping (SE)

( * ) Notice: Subject to any disclaimer, the term of this patent is extended or adjusted under 35 U.S.C. 154(b) by 0 days.

(21) Appl. No.: 10/203,257

(22) PCT Filed: Feb. 6, 2001

(86) PCT No.: PCT/SE01/00225

§ 371 (c)(1),
(2), (4) Date: Aug. 7, 2002

(87) PCT Pub. No.: WO01/59890

PCT Pub. Date: Aug. 16, 2001

(65) Prior Publication Data

US 2003/0012248 A1 Jan. 16, 2003

(30) Foreign Application Priority Data

Feb. 8, 2000  (SE) .............................. 0000408

(51) Int. Cl.$^7$ .......................... H01S 3/081; H01S 3/10; H01S 3/30
(52) U.S. Cl. .............................. 372/93; 372/26; 372/8
(58) Field of Search ................ 372/26, 101; 345/85; 356/247

(56) References Cited

U.S. PATENT DOCUMENTS

| | | | | |
|---|---|---|---|---|
| 3,660,779 A | * | 5/1972 | Cuff et al. ............ | 362/19 |
| 4,111,564 A | * | 9/1978 | Trice, Jr. ............... | 356/247 |
| 4,758,729 A | * | 7/1988 | Monnin ................. | 250/559.22 |
| 4,829,537 A | * | 5/1989 | Baer ..................... | 372/66 |
| 4,968,126 A | * | 11/1990 | Johnson ................. | 359/858 |
| 5,018,447 A | * | 5/1991 | Miller et al. .......... | 102/213 |
| 5,115,266 A | * | 5/1992 | Troje .................... | 396/21 |
| 5,118,922 A | * | 6/1992 | Rothe .................... | 250/201.2 |
| 5,257,279 A | * | 10/1993 | Dugan et al. .......... | 372/101 |
| 5,335,244 A | * | 8/1994 | Dugan et al. .......... | 372/101 |
| 5,506,597 A | * | 4/1996 | Thompson et al. .... | 345/85 |
| 6,304,285 B1 | * | 10/2001 | Geng ..................... | 348/36 |
| 6,392,821 B1 | * | 5/2002 | Benner, Jr. ............. | 359/727 |

FOREIGN PATENT DOCUMENTS

| | | |
|---|---|---|
| EP | 0635986 | 1/1995 |
| EP | 001296163 A2 * | 9/2002 |
| JP | 09015526 | 1/1997 |
| JP | 09229637 | 9/1997 |
| RU | 2141623 | 11/1999 |

* cited by examiner

*Primary Examiner*—Don Wong
*Assistant Examiner*—Hung Tran Vy
(74) *Attorney, Agent, or Firm*—Swidler Berlin Shereff Friedman, LLP

(57) ABSTRACT

The invention in question relates to a laser arrangement (1). The device includes the means (2, 4) to steer the laser beam across a reflecting body (3). The body (3) is arranged to reflect the said laser beam so that it is aimed in a surrounding space within an area that, from an instrument plane (11) of the reflecting body (3), covers at least a part of a circular revolution, as well as an angle interval approximately ±60° to the instrument plane. The device is characterized in that its steering means (2, 4) is arranged in the path of the laser beam between the laser (1) and the reflecting body (3), and is arranged to steer the laser beam, within the area, in accordance with a pre-selected direction, whereby the steering means comprises a spatial light modulator (2), whose phase-shift pattern determines the modulated angle from the modulator.

16 Claims, 4 Drawing Sheets

LASER ARRANGEMENT

TECHNICAL FIELD

The invention relates to a laser arrangement for controlling the direction of a beam from a laser.

STATE OF THE ART

In many applications, it is desirable to be able to aim a laser, for example to make it sweep across large areas. Normally, the laser is mounted on a rotating table that can be swivelled to enable the laser to execute a sweeping motion. When the laser is to be used in an environment subject to jolting, the rotating table's movement can be controlled by attachment to a gyro, thereby stabilizing the laser beam.

JP 09015526 A provides an alternative arrangement featuring a cone-shaped mirror asymmetrically arranged on an axle. The axle itself can in turn be rotated using a motor. A steadily directed laser beam hitting the surface of the mirror will, because of the asymmetry, be reflected in a direction dependent on the angle of the axle. Consequently, this arrangement allows for the possibility of sweeping the mirror-reflected laser beam through a full 360° by rotating the axle one complete revolution.

DESCRIPTION OF THE INVENTION

According to one aspect of the invention in question, this device provides a laser arrangement with the means to steer the laser beam across a reflecting body, which is in turn designed to reflect the said laser beam so that it is aimed in a surrounding space within an area, which from the reflecting body covers at least a part of a circular rotation in the instrument plane, as well as an angle interval of approximately ±60° in relation to the instrument plane. The device is characterised in that the steering mechanism is arranged in the path of the beam between the laser and the reflecting body, and it is designed to direct the laser beam, within the area, according to a pre-selected direction of the reflected beam. The steering mechanism in the device comprises a spatial light modulator (SLM), whose phase-shift pattern determines the modulating angle from the light modulator.

The light modulator's phase-shift pattern alters the modulating angle by shifting the phase at different points across the cross-section of the beam by different amounts depending on the desired modulation of the beam. For example, etched glass plates can be used for altering the phase front of a laser beam. These patterned plates are called kinoforms.

The reflecting body can have a number of different shapes. By allowing the laser beam to sweep across the envelope surface of a cone or truncated cone, it is possible to reflect the laser beam in the surrounding space within an area that from the envelope surface in the instrument plane comprises a circular loop as well an angle interval of approximately ±45° to the instrument plane. This possible area of reflection can be achieved without having to turn the laser itself. Approximately the same possible reflecting area could be obtained using an essentially hemispherical reflecting body. This reflecting area could be somewhat larger by using reflecting bodies with other shapes, for example a parabolic-shaped reflecting body, or a wide-angled lens.

It is preferable for the steering mechanism to contain some calculating unit arranged to calculate the direction of the beam in relation to the pre-selected direction, as well as calculate the phase-shift pattern settings of the light modulator accordingly. It would also be preferable for the phase-shift pattern to be calculated so that aiming in the chosen direction is achieved without any significant loss of strength.

The limit of the light modulator's image-update speed is about 10 kHz. It is therefore possible with the help of a spatial light modulator to direct the laser beam in up to 10,000 directions per second anywhere within the above-mentioned area. Using a spatial light modulator means that none of the device's components contain any moving parts, facilitating a very long life expectancy for the device, and low manufacturing and maintenance costs.

By using the light modulator above, it is possible to steer the beam in such a way so as to inhibit the occurrence of beam divergence at the reflecting body. The calculating unit is arranged to instruct the light modulator to reshape the laser beam's wave front so as to avoid the occurrence of beam divergence.

For applications in environments exposed to movement and vibration, it can be of considerable advantage if the laser, light modulator and reflecting organ are all firmly fixed in a system together with a movement-detection device, such as a gyro. In this embodiment, on calculating the beam direction, the steering mechanism is designed to compensate for movement in the system detected by the gyro. The system can therefore be stabilized without the need for moving parts such as a rotating or stabilizing table. This produces considerable cost savings in design, manufacture and maintenance.

SHORT DESCRIPTION OF THE DRAWINGS

EXAMPLES OF THE EMBODIMENTS

Figure 1:
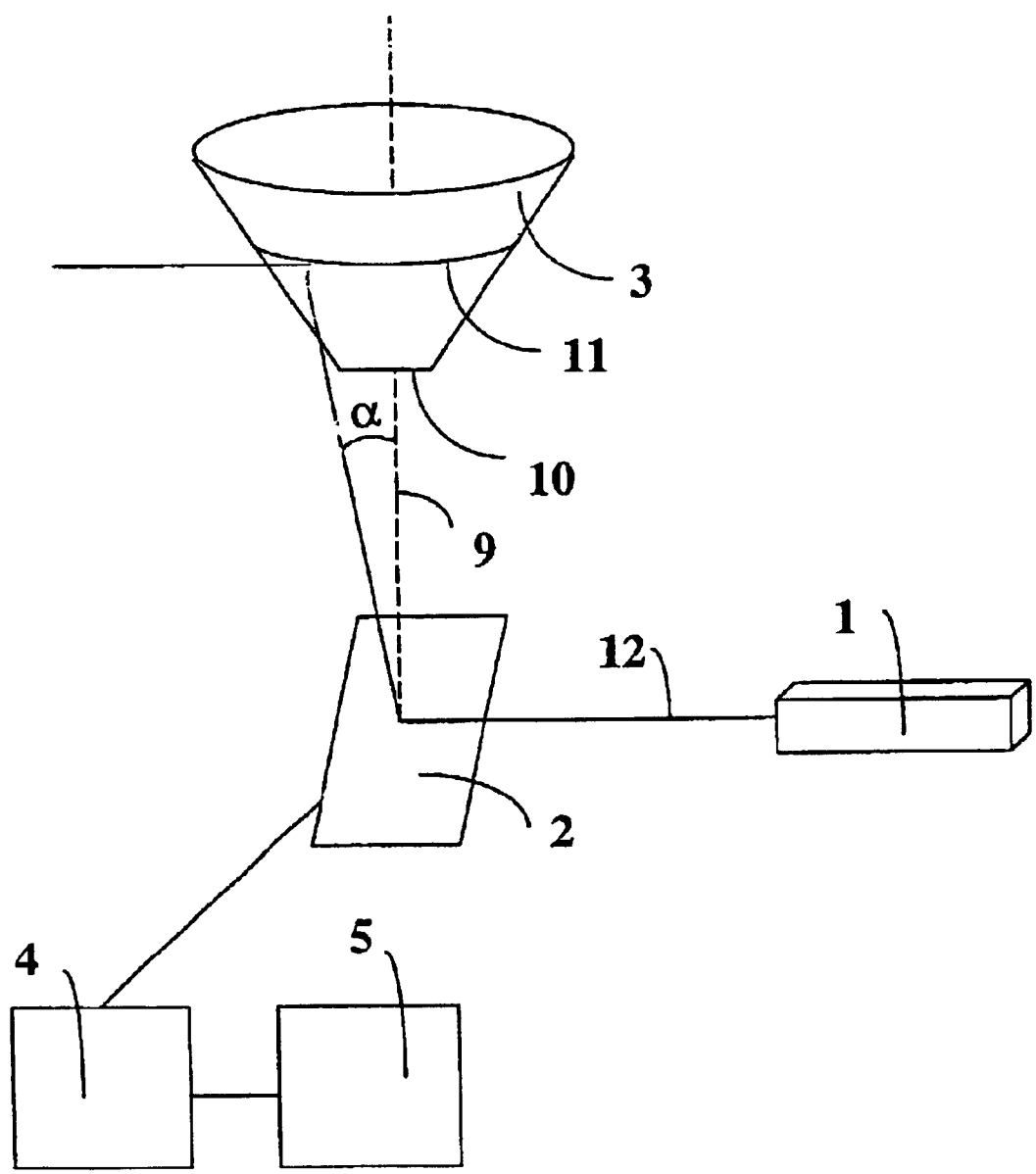
FIG. 1 is a diagrammatical representation of an example of a system based on the invention.

In FIG. 1, the laser is denoted by the number 1 and the spatial light modulator SLM placed in the path of the beam 12 from the laser 1 by the number 2. A mirror, denoted by 3, is placed in such a way as to make it possible to guide the laser beam across it via the SLM 2. In this example, the mirror 3 is designed as an envelope surface of a circular truncated cone. The laser 1, SLM 2 and mirror 3 are firmly fixed at a defined distance to each other, so as to negate any movement in relation to one another. Thus, the beam from the laser 1 always hits the SLM 2 at the same angle. It ought to be pointed out that the term laser radiation here refers to both an unbroken flow of light and a pulse.

The design of an SLM 2 will not be discussed in detail here, but some of its important features ought to be mentioned for the sake of understanding. The SLM can be used to alter the phase of the laser light perpendicular to the longitudinal direction of the beam in order to focus, defocus or alter the beam in another way. An important feature is that the wave front in the beam that hits the SLM 2 can be directed away at an angle other than that obtained by reflection at the SLM's 2 surface. It has been shown that it is possible to angle, or direct beams up to 30° away from the planned reflection direction through altering the phase in the beam. In this way it is possible to direct the laser radiation from the SLM 2 onto an area defined as a cone, with the SLM 2 at the apex of the cone and the reflecting surface of the mirror 3 at the bottom of the cone, the angle of inclination of the cone being determined by the maximum modulation angle α used. Because the beam is steered by shifting the phase, the bulk of the incoming beam's energy will be angled away in the planned direction given by the SLM phase pattern, which will be described below. With modulating angles (α) up to 30°, there is very little strength left in the laser beam. It is more realistic at the present time to use modulating angles (α) of up to 4°, whereby very good resolution is retained. Very briefly, the angles within the modulated-angle area used are changed by the SLM's surface being provided with a pattern (the above mentioned phase pattern) that shifts the phase by different amounts at different points in the cross-section of the beam, depending on the desired modulation of the beam. For example, etched glass plates can be used to alter the phase front in a laser beam. These plates with patterns are called kinoforms.

As is evident from the above description, the cone-shaped mirror 3 is placed with its truncated top in the middle of the beam 9 to counteract any undesirable refection in the SLM's 2 surface. In one example, at the top of the truncated cone 10, there is a light trap in the form of a laser-light absorbing material for absorbing the undesired reflection. With the mirror's reflecting envelope surface placed symmetrically around the undesirable reflected beam pathway 9, reflection in the mirror's envelope surface according to the predetermined pattern is made possible by directing the beam from the SLM. For example, the beam from the SLM is aimed so that it hits the envelope surface along a radius 11 in such a way that the beam reflected from the mirror sweeps through 360°, in a direction perpendicular to the mirror's axle of symmetry (equivalent to the beam path 9). Hereafter the plane that the radius 11 lies on is referred to as the mirror's instrument plane. Depending on the SLM's maximum modulating angle (α), and the mirror's surface envelope gradient and distance in relation to the SLM, the beam can even be made to sweep upwards and downwards in relation to the mirror's instrument plane. With the cone-shaped mirror in FIG. 1, it is possible for the beam to sweep upwards and downwards about ±45° in relation to the instrument plane. When a very short cone is used, the beam is allowed to sweep upwards and downwards only a few degrees from the instrument plane. In a further case, using a cone partitioned along the mirror's symmetrical axis, it is possible for the beam to sweep through, for example, 180° or 90°.

A calculating unit 4, for example a personal computer (PC), is connected to the SLM 2 and is designed to influence the setting of the SLM's 2 phase pattern. The PC 4 is equipped with software for entering information from a user for directing the laser beam either at a target in space (for example, given by its co-ordinates), or in a direction into space (for example, by means of angles). The software contains instructions for calculating how the beam from the SLM 2 should be aimed so as to achieve a reflected beam, directed according to the user's input, as well as the instructions for setting the phase pattern of the SLM accordingly. For specialists in the field, it is obvious how these calculations are done, and how they could be implemented in the software. When long sequences of information are entered, for example when aiming the laser beam at several targets one after the other, or when making the beam carry out sweeping movements across an area, it is possible to update the direction of the mirror-reflected beam with a high level of frequency. As it is currently possible to run the SLM with a image-update speed of at least 10 kHz (i.e. 10,000 phase patterns per second), it is possible to update the beam's modulating angle (α) from this with a frequency of up to 10 kHz, as long as the capabilities of the PC and/or interface between the PC and SLM is sufficiently high.

Where the PC's capacity does not accommodate real-time calculations of the phase pattern's appearance for each angle, then the phase pattern can be calculated beforehand for a number of angles, from which the intermediate positions can be interpolated in real time. It should be remembered that a given phase pattern in an SLM only directs the laser light effectively within a certain wavelength. Different laser wavelengths require therefore that different phase patterns be calculated.

In one example, the PC 4 contains programme instructions designed to influence the light modulator to reshape the laser beam's wave front in order to avoid beam divergence occurring on reflection in the mirror. Experts in the field will easily understand how these instructions can be implemented.

In the example shown in FIG. 1, the laser 1, the SLM 2 and the mirror 3 are all fixed in a system together with a gyro 5. The PC 4 is connected to the gyro 5 and set up via an interface (not shown) to receive data relating to movements in the system via the gyro. On calculation of the SLM settings, movements in the system are therefore detected and compensated for, so that the beam from the system is aimed at the given point in space, regardless of the system's movement. It is clear to an expert in the field how this could be implemented in the software.

Figure 2:
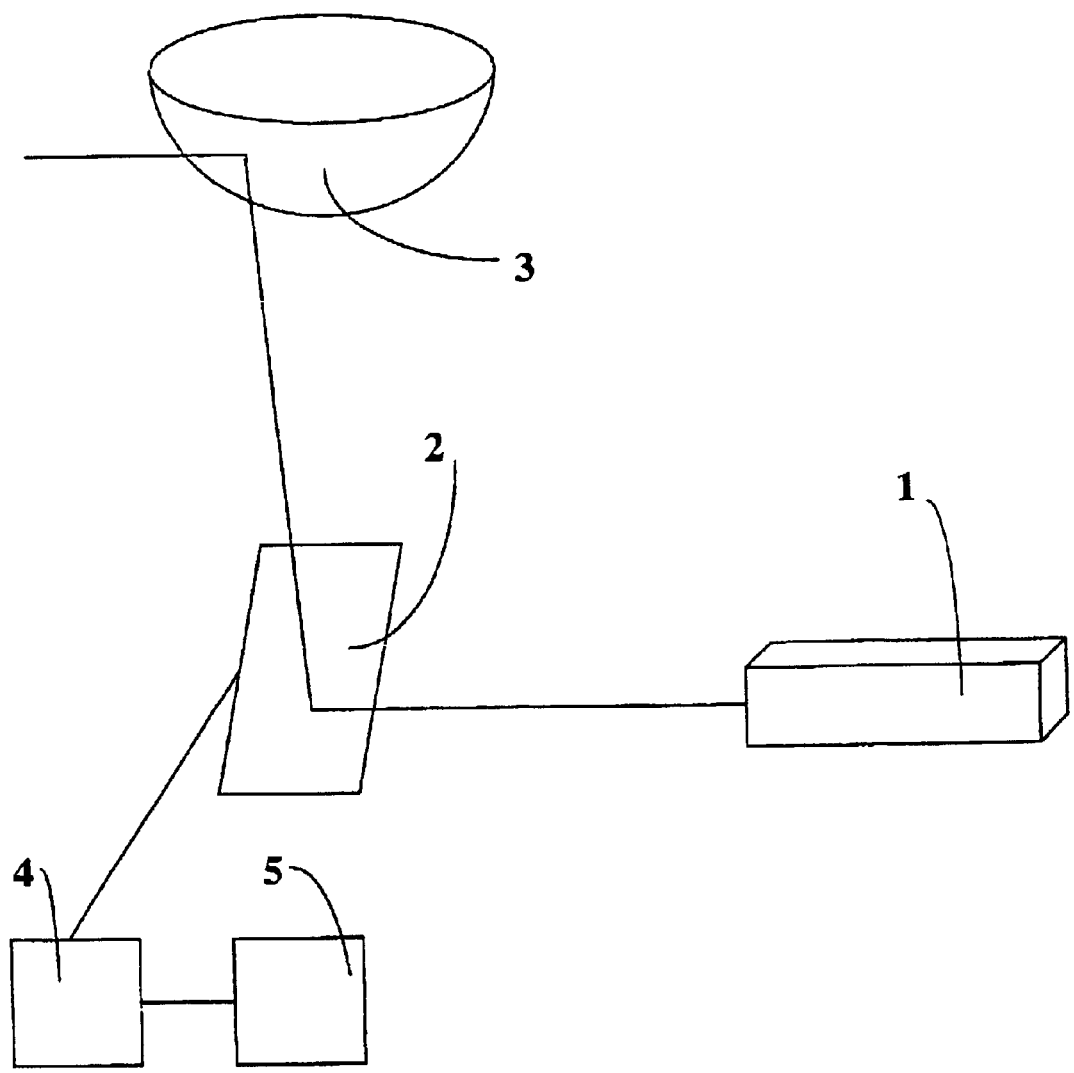
FIG. 2 is a diagrammatical representation of an alternative system, also based on the invention.

In the example shown in FIG. 1, the mirror 3 is designed as a truncated cone. Experts in the field would easily recognise that mirrors shaped in a number of other ways would also be able to be used, without falling outside the framework of the invention as stated in the accompanying claims, for example the hemispherical mirror 3 in the example shown in FIG. 2. As described above, even mirrors whose reflecting surfaces constitute part of a circular revolution—such as a semi- or a quarter circle-are included. As mentioned earlier, it is possible by means of a mirror shaped like a cone's enveloping surface, to reflect the laser beam into space within an area defined by the mirror's instrument plane and an angle interval of about ±45° in relation to the instrument plane, and whose length is determined by the strength of the laser's light. It would be possible to achieve about the same reflecting area with a hemispherical mirror 3. It would also be possible to manufacture other reflecting mirrors or lenses, whose shapes are optimized to increase the width of the above-mentioned lobe.

Figure 3:
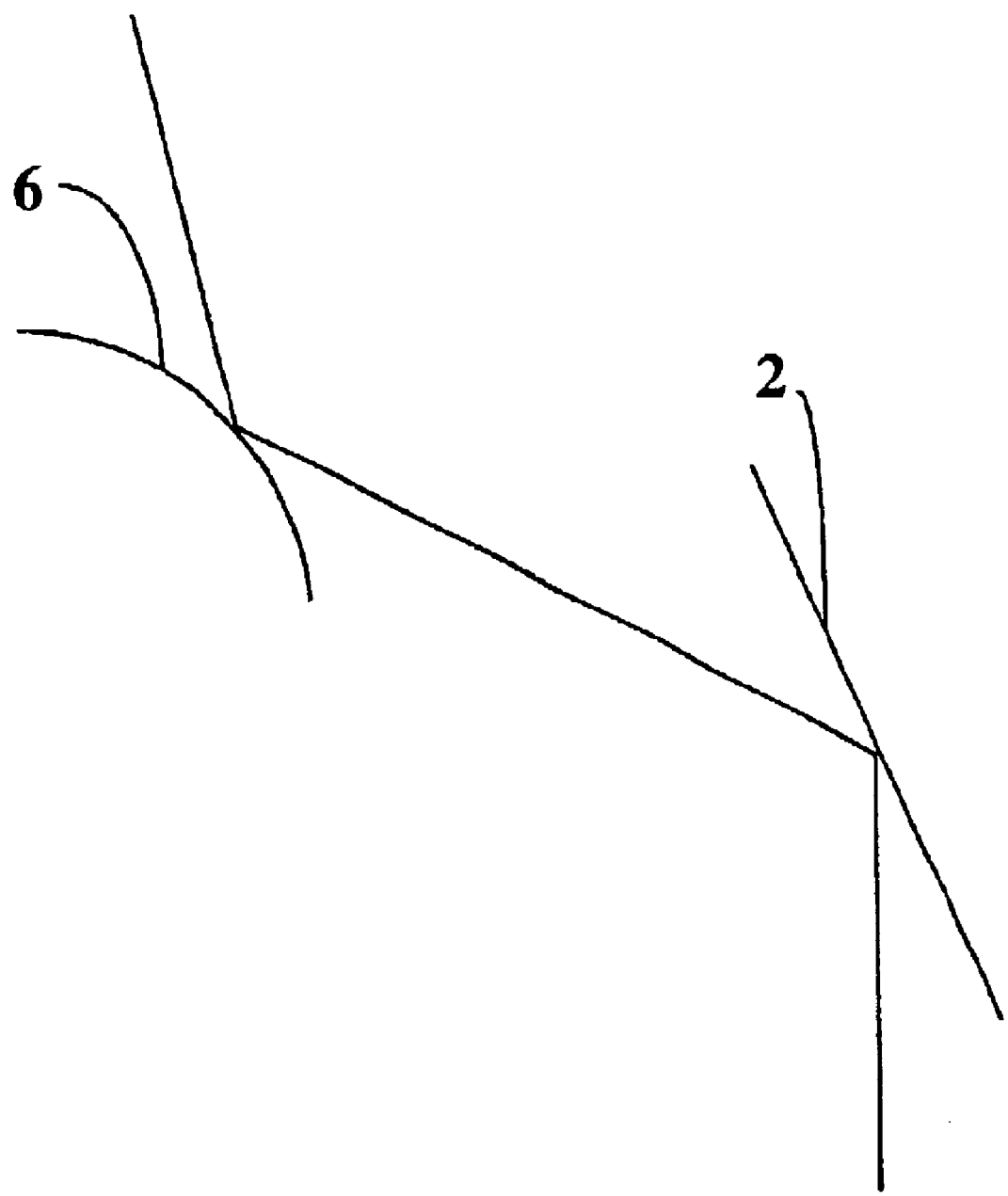
FIG. 3 illustrates an example of a mirror inserted into the system shown in FIG. 1.

The number 6 in FIG. 3 denotes a convex mirror, which in an alternative embodiment is placed between the SLM 2 and the mirror 3, and is referred to here as an intermediate mirror. It is appropriate to introduce such an intermediate mirror 6 into the system in a situation where the maximum modulated angle (α) of the SLM 2 is considered insufficient.

Figure 4:
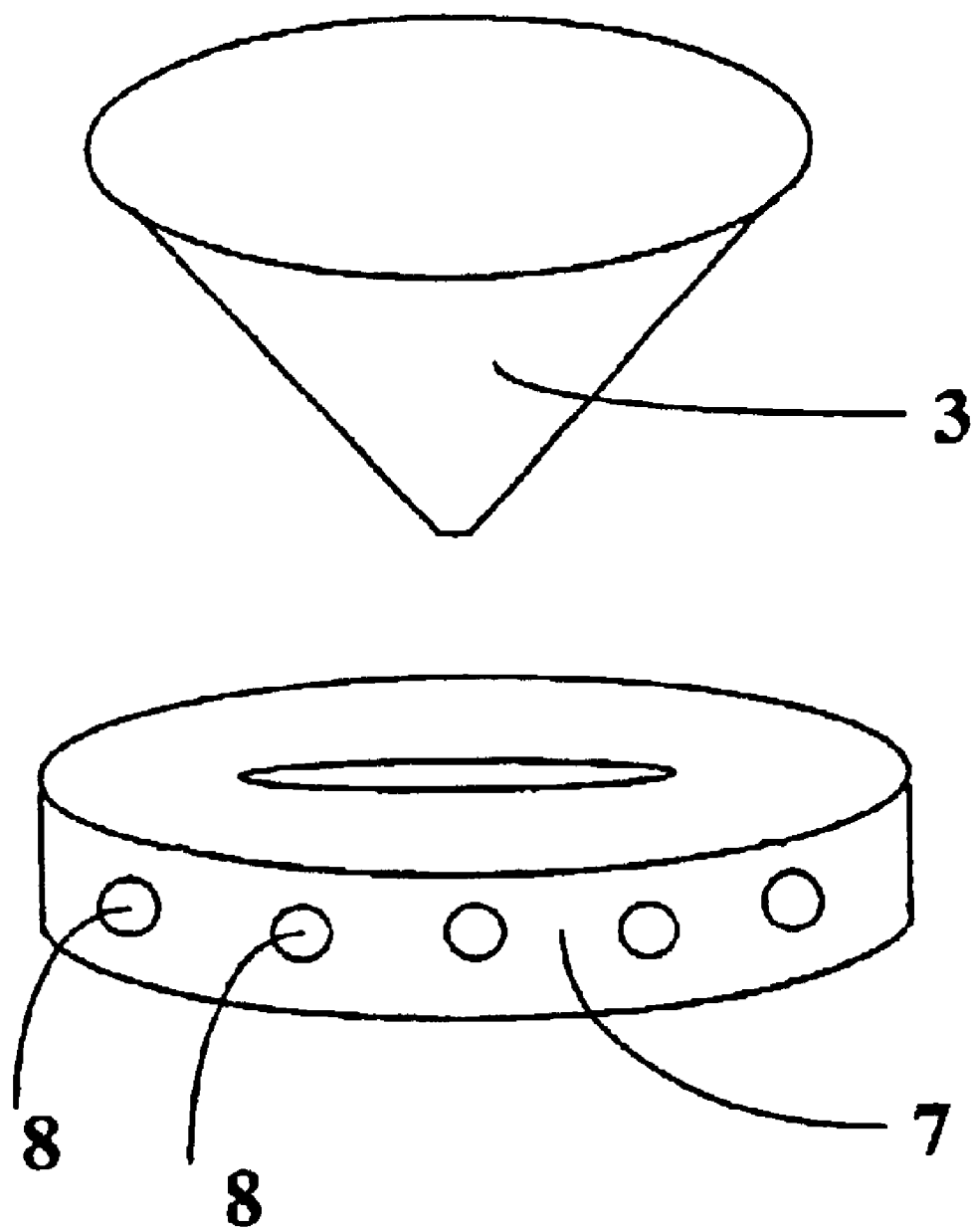
FIG. 4 illustrates an example of a receiver for the system shown in FIG. 1.

The above mentioned system is suitable for a wide range of applications. In one instance, it is used as a laser pointer that has the ability to point to up to 10,000 targets per second 360° laterally, and, with a well-shaped mirror, −45° to 60° vertically. In an additional embodiment, the system is used as a large laser. It is even possible to use the system as a laser-based range finder or radar. For these applications, it is necessary for a receiver-sensor arrangement to be incorporated in the system. The example in FIG. 4 shows a receiver-sensor arrangement 7 mounted under the mirror 3, with the sensors 8 arranged in a ring.

Since the SLM's settings can be quickly changed, it is possible to rapidly remove the beam from the system so as to deal with many targets at the same time and/or to utilize several lasers that, for example, work at separate frequencies.

In the above-mentioned examples, the SLM is shown in a reflecting embodiment. The invention is of course not limited to this embodiment. In a transmitting embodiment of the SLM, a laser is placed directly under the mirror 3, with the SLM positioned between the laser 1 and the mirror 3.

What is claimed is:

1. A laser arrangement, comprising means for steering a laser beam across a reflecting body, which in turn is designed to reflect the laser beam so that it is then aimed in a surrounding space within an area that, from the reflecting body and in an instrument plane lying perpendicular to an axis of symmetry of the reflecting body and intersecting a radius at which the laser beam hits an envelope surface of the reflecting body, covers at least a part of a circular revolution, as well as an angle interval of about ±60° to the instrument plane, wherein the steering means is arranged in a path of the laser beam between the laser and the reflecting body, and is arranged to steer the laser beam, within the area, in accordance with a pre-selected direction of a reflected beam, whereby the steering means comprises a spatial light modulator, having an input for setting a phase-shift pattern, which determines a modulated angle from the modulator and wherein the steering means includes a calculating unit operatively connected to a light modulator, and arranged to calculate the setting of the light modulator's phase-shift pattern from the pre-selected direction.

2. Arrangement according to claim 1, wherein the reflecting body is essentially cone-shaped.

3. Arrangement according to claim 1, wherein the reflecting body is essentially hemispherical in shape.

4. The apparatus of claim 1, wherein the calculating unit is arrange to instruct the light modulator to reshape the laser beam's wave front so as to avoid the occurrence of beam divergence at the reflecting body.

5. Arrangement according to claim 1, wherein the at least the laser, the light modulator, and the reflecting body are all fixed in one system, together with a movement-sensing device, preferably a gyro, whereby, on calculation of the beam direction, the calculating unit operates to compensate for movements in the system detected by means of the gyro.

6. An apparatus comprising:
a spatial light modulator operable to steer a laser beam in response to an input; and
a reflecting body operable to reflect the steered laser beam from the spatial light modulator;
whereby the input is operable to aim the laser beam into a surrounding space within an area that covers at least a part of a circular revolution of an envelope surface of the reflecting body and an angle interval of about ±60° to an instrument plane, wherein the instrument plane lies perpendicular to an axis of symmetry of the reflecting body and intersecting a radius at which the laser beam hits the envelope surface of the reflecting body and further comprising a calculating unit operatively connected to the input of the spatial light modulator and operable to calculate a setting of a phase-shift pattern of the spatial light modulator corresponding to a pre-selected direction.

7. The apparatus of claim 6, wherein the reflecting body is substantially cone-shaped.

8. The apparatus of claim 6, wherein the reflecting body is substantially hemispherical in shape.

9. The apparatus of claim 6, wherein the calculating unit is further operable to instruct the spatial light modulator to reshape a wave front of the laser beam so as to avoid occurrence of beam divergence at the reflecting body.

10. The apparatus of claim 9, wherein the reflecting body is substantially cone-shaped.

11. The apparatus of claim 9, wherein the reflecting body is substantially hemispherical in shape.

12. The apparatus of claim 6, further comprising a laser source of the laser beam and wherein at least the laser source, the spatial light modulator, and the reflecting body are all fixed in one system.

13. The apparatus of claim 12, further comprising a movement-sensing device and wherein the calculating unit is further operable to compensate for movements in the system detected by the movement-sensing device.

14. The apparatus of claim 13, wherein the movement-sensing device comprises a gyro.

15. The apparatus of claim 14, wherein the reflecting body is substantially cone-shaped.

16. The apparatus of claim 14, wherein the reflecting body is substantially hemispherical in shape.

* * * * *

UNITED STATES PATENT AND TRADEMARK OFFICE
CERTIFICATE OF CORRECTION

PATENT NO.    : 6,792,024 B2
DATED         : September 14, 2004
INVENTOR(S)   : Hans Åkerlund It is certified that error appears in the above-identified patent and that said Letters Patent is hereby corrected as shown below:

Title page,
Item [75], Inventor, change "Äkerlund" to -- Åkerlund --, change "Götaborg" to
-- Göteborg --
Item [30], Foreign Application Priority Data, change "0000408" to -- 0000408-5 --.

Signed and Sealed this

Seventh Day of December, 2004

JON W. DUDAS
*Director of the United States Patent and Trademark Office*